United States Patent [19]

Juang

[11] Patent Number: 5,028,908
[45] Date of Patent: Jul. 2, 1991

[54] CONTROL CIRCUIT FOR VEHICLE TAILLIGHTS

[76] Inventor: Ing-Bin Juang, No. 17, Lane 223, Chung-Ching St., San-Min District, Kaohsiung City, Taiwan

[21] Appl. No.: 513,686
[22] Filed: Apr. 24, 1990
[51] Int. Cl.⁵ .............................................. B60Q 1/44
[52] U.S. Cl. ..................................... 340/479; 340/475
[58] Field of Search ................ 340/475, 479; 307/10.8

[56] References Cited

U.S. PATENT DOCUMENTS

| | | | |
|---|---|---|---|
| 2,706,809 | 4/1955 | Hollins | 340/479 X |
| 4,556,862 | 12/1985 | Meinershagan | 340/479 X |
| 4,663,609 | 5/1987 | Rosario | 310/479 |
| 4,791,401 | 12/1988 | Heidmar, Jr. | 340/479 |
| 4,896,137 | 1/1900 | Lee, III et al. | 340/479 |

Primary Examiner—Joseph A. Orsino
Assistant Examiner—Brian R. Tumm
Attorney, Agent, or Firm—Morton J. Rosenberg; David I. Klein

[57] ABSTRACT

An auxiliary control circuit for controlling taillights, especially the brake light and turn signal lights, of a vehicle is provided. The circuit is designed to function such that, when the brake of the vehicle is applied, the brake light blinks continuously for the length of time that the brake is applied. At the same time, the turn signal lights simultaneously blink in an alternating fashion for enhancing warning effect. When the brake is applied and the turn signal switch is actuated for the purpose of providing a turning indication, the brake light and the turn signal lights work independently in the usual manner.

2 Claims, 1 Drawing Sheet

CONTROL CIRCUIT FOR VEHICLE TAILLIGHTS

BACKGROUND OF THE INVENTION

This invention relates to a control circuit for controlling taillights, such as brake lights and turn signal lights, of vehicles.

Conventionally, for safety reasons, vehicles such as automobiles and motorcycles have installed therein, taillights which include turn signal lights, brake lights, rear lights and reversing lights (automobiles only), which function independently. In present practice, the rear light and brake light are combined in a single two-in-one lamp, the warning of braking being actuated by operation of the brake, to automatically switch on the brake light. This is not a sufficient warning, especially during the evening when the rear lights have been switched on. This defect is now circumvented by the installation of an extra brake light to the car, adding extra costs and additional labor for this installation. To this end, the instant invention is directed to an auxiliary control circuit for controlling taillights, and overcoming the drawbacks of known warning systems for vehicles.

OBJECTS OF THE INVENTION

An object of this invention is to provide an auxiliary control circuit for vehicle taillights which can diminish the disadvantages of known warning systems for vehicles.

Another object of this invention is to provide an auxiliary control circuit for vehicle taillights by which the brake lights and the turn signal lights blink in alternation when the brake of the vehicle is applied.

A further object of this invention is to provide an auxiliary control circuit for vehicle taillights by which the brake lights and the turn signal lights are switched on independently when both the brake of the vehicle is applied and the turn signal switch is actuated.

BRIEF DESCRIPTION OF THE DRAWINGS

The present preferred exemplary embodiment will be described in detail with respect to the following drawings, wherein.

DETAILED DESCRIPTION OF THE PREFERRED EMBODIMENTS

Figure 1:
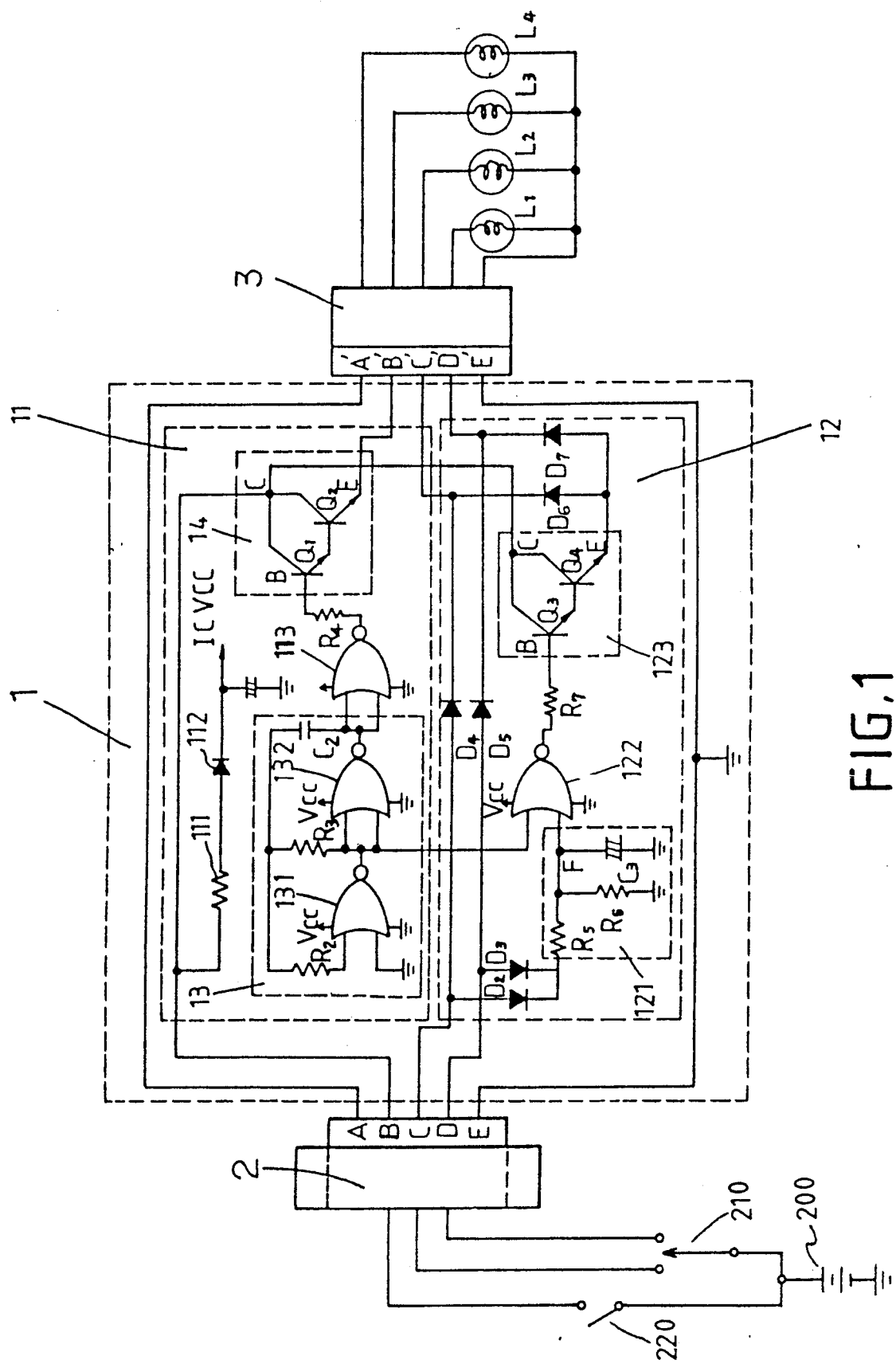
FIG. 1 is a schematic circuit diagram of a vehicle taillight auxiliary control system according to this invention.

Referring now to FIG. 1, the auxiliary control circuit 1 of the present invention comprises a brake light control device 11 having a first Darlington driver 14 and a turn signal control device 12 having a second Darlington driver 123. The brake light control device 11 includes a protective resistance 111 having one end connected to a diode 112 and the opposing end connected to terminal B of socket 2, one of the five terminals which are respectively designated as A,B,C,D and E of socket 2. The opposing end of diode 112 is coupled in series with the IC Vcc connection. NOR Gates 131, 132 and resistances R2, R3, capacitor C2 form an oscillation circuit 13 of which the output end is connected to a NOR Gate Buffer Amplifier 113. The output end of the NOR Gate Buffer Amplifier 113 is connected to the input end B of the first Darlington driver 14 through a resistance R4.

The first Darlington driver 14 comprises two transistors Q1 and Q2, wherein the collector C of transistor Q2 is connection both to the brake light terminal B of the socket 2 and to collector C of a transistor Q4 of the second Darlington driver 123. The emitter E of the transistor Q2 is connected to a brake light terminal B' of an output port 3.

The second Darlington driver 123 also comprises two transistors Q3 and Q4, wherein the emitter E of the transistor Q4 is connected to the anodes of two diodes D6 and D7. The cathode of diode D6 is connected to the left turn signal light terminal C' of the output port 3 and the cathode of the diode D7 is connected to the right turn signal light terminal D' of the output port 3, so as to prevent both the right and left turn lights, connected to terminals C' and D', from simultaneously operating when an input signal of one turn signal light is enabled.

The turn signal control device 12 further includes two diodes D4 and D5, which are connected directly and respectively between the right and left turn light terminals C,D of the socket 2 and the right and left turn light terminals C',D' of the output port 3. This prevents the point F, at the input to gate 122, from receiving high logic voltage level which would otherwise be fed back from the second Darlington driver 123. The turn signal control circuit 12 also includes two diodes D2 and D3, which are respectively connected to the right and left turn signal terminals C and D of the socket 2. The diodes D2 and D3 are both connected to resistor R5 of time delay circuit 121. Time delay circuit 122 comprises two resistors R5 and R6, and a capacitor C3, the second Darlington driver 123, the two diodes D6 and D7, a NOR Gate 122, and a resistance R7 between the second Darlington driver 123 and the NOR Gate 122.

One of the two inputs of the NOR Gate 122 is connected to the output point F of the time delay circuit 121, and the other input is connected to the output end of the NOR Gate 111 of the oscillation circuit 13. The output end of the NOR Gate 122 is connected to the base B of the transistor Q3 through a protective resistance R7.

When the brake of the vehicle is applied, the brake terminal B of the socket 2 becomes electrically connected to a power source, such as DC battery 200 of the vehicle by the vehicle brake switch 220. The electrical power from terminal B is fed through the protective resistance 111 and diode 112 to actuate the oscillation circuit 13, wherein the output logic level states of the NOR Gates 131, 132, 113 and 122 are momentarily represented as 1, 0, 1, 0, respectively. This means that the NOR Gates 131 and 113 have outputs at a high logic level state, while the NOR Gates 132 and 122 have outputs at a low logic level state. Under these conditions, with the NOR Gate 113 having a high logic level state output, the first Darlington driver 14 is triggered to turn on a brake lamp L3, which is connected to the brake light terminal B' of the port 3. At this time, the turn signal switch 210 of the vehicle, which can be actuated by the driver to turn on either of the turn signal lights of the vehicle, remains in an OFF state. Therefore, the turn signal light terminals C and D of the socket 2 are not connected to the electrical power source 200 of the vehicle, and thus kept at a low logic level state. Such renders the two diodes D2 and D3 in the input end of the signal control circuit 12 nonconductive, and the F point is therefore at a low logic voltage.

Since the NOR Gate 131 alternates between a high voltage logic level and a low voltage logic level state, the second Darlington driver 123 is alternately triggered to periodically turn on signal lamps L1 and L2, which are respectively connected to the turn light terminals C', D' of the port 3, by way of NOR Gate 122, since one of its two inputs are connected to the output end of the NOR Gate 131 and the other is at a low voltage logic level. By means of this control circuit, the brake lamp L3 blinks continuously as long as the brake is applied, and the turn signal lamps L1 and L2 blink simultaneously in an alternating fashion, in accordance with the oscillating frequency of the oscillation circuit 13.

Under the conditions when the brake is applied and the turn signal switch 210 of the vehicle is actuated to turn on either one of the turn signal lights, one of the two diodes D2, D3 conducts a sample voltage to the F point, raising it to a high voltage logic level state, through the delay circuit 121. Due to the high voltage logic level state, the input from the NOR Gate 131 of the oscillation circuit 13 has no influence, and the output end of the NOR Gate 122 is thereby held at a low voltage logic level state. This maintains the second Darlington driver 123 in an OFF state. Either of the two turn signal terminals C or D of the socket 2 are connected to the electrical power source 200 of the vehicle by the driver's actuation of the turn signal switch 210 to turn on the corresponding turn signal lamp L1 or L2 through the respective one of the two diodes D4 or D5. Such energizes the turn signal light terminals C', D' of the port 3 to provide the usual operation of the taillights.

Under the condition where the brake is still applied, but the turn signal switch 210 is switched off, the usual operation of the brake light and turn signal lights is altered to blink in alternation. The oscillating effect of the oscillation circuit 13 taking effect after a preset period of delay through actuation of the delay circuit 121.

While a representative embodiment and details has been shown for the purpose of illustrating the invention, it will be apparent to those skilled in this art that various changes and modifications may be made therein without departing from the spirit or scope of the invention.

What is claimed is:

1. An auxiliary control circuit for vehicle taillights comprising:
   a source of direct current;
   socket means having at least a brake light terminal and two turn signal terminals for coupling to a vehicle's wiring;
   switching means for independently interconnecting said source of direct current and the terminals of said socket means;
   output means having at least a brake light terminal and two turn signal terminals for coupling to said vehicle taillights;
   circuit means for connecting respective lamps of said taillights to the terminals of the output means;
   a brake light control device having (1) an output formed by a first Darlington driver, said first Darlington driver being formed by two transistors, with an emitter of one of the transistors connected to the brake light terminal of the output means, and (2) an oscillation circuit formed with a plurality of first NOR Gates having at least one of said first NOR Gates connected to an input end of the first Darlington driver for triggering thereof;
   a turn signal device having (1) a second Darlington driver formed by two transistors with an emitter of one of the transistors connected to the two turn signal terminals of the output means through a respective pair of diodes, (2) a time delay circuit with its input end connected to the two turn signal terminals of the socket means through a respective pair of diodes, and (3) a second NOR Gate having an input connected to an output of the time delay circuit, said second NOR Gate having another input connected to an output of another of said plurality of first NOR Gates of the oscillation circuit, said second NOR Gate having an output connected to an input of the second Darlington driver for triggering thereof.

2. An auxiliary control circuit for vehicle taillights as claimed in claim 1 wherein an additional two diodes are further provided with further circuits for respectively and directly interconnecting the turn signal terminals of the socket means and the output means.

* * * * *